US009195272B2

(12) United States Patent  (10) Patent No.: US 9,195,272 B2
O'Brien  (45) Date of Patent: Nov. 24, 2015

(54) EXPANDABLE MOBILE DEVICE

(71) Applicant: MICROSOFT TECHNOLOGY LICENSING, LLC, Redmond, WA (US)

(72) Inventor: Paul M. O'Brien, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/243,759

(22) Filed: Apr. 2, 2014

(65) Prior Publication Data
US 2014/0211399 A1 Jul. 31, 2014

Related U.S. Application Data

(63) Continuation of application No. 13/224,839, filed on Sep. 2, 2011, now Pat. No. 8,711,566.

(51) Int. Cl.
G06F 1/16 (2006.01)

(52) U.S. Cl.
CPC ............ G06F 1/1652 (2013.01); G06F 1/1624 (2013.01); *Y10T 29/49002* (2015.01)

(58) Field of Classification Search
CPC combination set(s) only.
See application file for complete search history.

(56) References Cited

U.S. PATENT DOCUMENTS

| 5,349,772 | A  | 9/1994  | Pardue |
| 6,288,891 | B1 | 9/2001  | Hasegawa et al. |
| 6,532,147 | B1 | 3/2003  | Christ, Jr. |
| 6,643,124 | B1 | 11/2003 | Wilk |
| 6,762,929 | B2 | 7/2004  | Sawyer |
| 6,859,219 | B1 | 2/2005  | Sall |
| 6,931,265 | B2 | 8/2005  | Reyes et al. |
| 7,149,557 | B2 | 12/2006 | Chadha |
| 7,426,107 | B2 | 9/2008  | Yeh et al. |
| 7,558,057 | B1 | 7/2009  | Naksen et al. |
| 7,667,962 | B2 | 2/2010  | Mullen |
| 7,723,733 | B2 | 5/2010  | Daniels et al. |

(Continued)

FOREIGN PATENT DOCUMENTS

| CN | 1989760   | 6/2007 |
| EP | 2187247   | 5/2010 |
| EP | 2360517   | 8/2011 |
| TW | 200627945 | 8/2006 |

OTHER PUBLICATIONS

"International Search Report and Written Opinion", Application No. PCT/US2012/053254, Feb. 22, 2013, 8 pages.

(Continued)

*Primary Examiner* — Lisa Lea Edmonds
(74) *Attorney, Agent, or Firm* — Judy Yee; Micky Minhas

(57) ABSTRACT

In embodiments of an expandable mobile device, the device includes first and second housing parts that slide-engage relative to each other to extend and retract the device. The expandable mobile device includes a flexible display that extends from an interior of the expandable mobile device as the second housing part slides out from the first housing part. The flexible display also retracts into the interior of the expandable mobile device as the second housing part slides into the first housing part. Rollers are integrated in the first housing part and bend the flexible display around a fixed radius to position a first section of the flexible display approximately parallel to a second section of the flexible display in a retracted position of the expandable mobile device.

20 Claims, 5 Drawing Sheets

(56) References Cited

U.S. PATENT DOCUMENTS

| | | |
|---|---|---|
| 7,746,293 B2 | 6/2010 | Kobayashi |
| 7,830,333 B2 | 11/2010 | Aoki |
| 7,928,934 B2 | 4/2011 | Kane |
| 7,965,258 B2 | 6/2011 | Aoki |
| 8,170,631 B2 | 5/2012 | Aoki |
| 8,194,399 B2 | 6/2012 | Ashcraft et al. |
| 8,289,232 B2 | 10/2012 | Kobayashi |
| 8,363,393 B2 | 1/2013 | Bemelmans |
| 8,379,377 B2 | 2/2013 | Walters et al. |
| 8,493,726 B2 | 7/2013 | Visser et al. |
| 8,711,566 B2 | 4/2014 | O'Brien |
| 2004/0196268 A1 | 10/2004 | Hsu et al. |
| 2005/0146498 A1 | 7/2005 | Hemia et al. |
| 2005/0253775 A1 | 11/2005 | Stewart |
| 2006/0082518 A1 | 4/2006 | Ram |
| 2006/0166713 A1 | 7/2006 | Yeh et al. |
| 2006/0176243 A1 | 8/2006 | Yeh |
| 2007/0069975 A1 | 3/2007 | Gettemy et al. |
| 2007/0146243 A1 | 6/2007 | Ou Yang |
| 2008/0086925 A1 | 4/2008 | Yang |
| 2008/0144265 A1 | 6/2008 | Aoki |
| 2008/0151480 A1 | 6/2008 | Chung et al. |
| 2008/0158795 A1 | 7/2008 | Aoki et al. |
| 2008/0182109 A1 | 7/2008 | Hashimoto |
| 2008/0204367 A1 | 8/2008 | Lafarre et al. |
| 2008/0247126 A1 | 10/2008 | Otsuka et al. |
| 2008/0318633 A1 | 12/2008 | Wong et al. |
| 2009/0051830 A1 | 2/2009 | Matsushita et al. |
| 2009/0237872 A1 | 9/2009 | Bemelmans |
| 2010/0164973 A1 | 7/2010 | Huitema et al. |
| 2010/0174930 A1 | 7/2010 | Kim |
| 2010/0182738 A1 | 7/2010 | Visser et al. |
| 2010/0246113 A1 | 9/2010 | Visser et al. |
| 2010/0281441 A1 | 11/2010 | Eldon et al. |
| 2011/0043479 A1 | 2/2011 | van Aerle et al. |
| 2011/0176260 A1 | 7/2011 | Walters et al. |
| 2012/0002357 A1 | 1/2012 | Auld et al. |
| 2012/0314400 A1 | 12/2012 | Bohn et al. |
| 2013/0044410 A1 | 2/2013 | Verschoor et al. |
| 2013/0058063 A1 | 3/2013 | O'Brien |

OTHER PUBLICATIONS

"LG 3D Mobile Phone with Photovoltaic Cells and Expandable Touch Display", http://www.thedesignblog.com, retrieved from <http://design.fr/news/lg-3d-mobile-phone-with-photovoltaic-cells-and-expandable-touch-display/> on Apr. 27, 2011,Jun. 2, 2010, 7 pages.

"Nokias Mobile Phones N85 Vs N75 Vs N95 Screen Comparison AMOLED V LCD", retrieved from <http://www.oled-display.net/nokias-mobile-phones-n85-vs-n75-vs-n95- screen-comparison-amoled-vs-lcd> on Apr. 26, 2011, 4 pages.

"Non-Final Office Action", U.S. Appl. No. 13/224,839, Aug. 26, 2013, 9 pages.

"Non-Final Office Action", U.S. Appl. No. 13/154,876, Feb. 11, 2014, 6 pages.

"Notice of Allowance", U.S. Appl. No. 13/224,839, Dec. 13, 2013, 7 pages.

"Restriction Requirement", U.S. Appl. No. 13/154,876, Oct. 17, 2013, 7 pages.

"Samsung Captivate (TM)—Black", retrieved from <http://reviews.wireless.att.com/4773/sku4760319/samsung-samsung-captivate-tm-black-reviews/reviews.htm?page=18&sort=rating> on Apr. 26, 2011, 7 pages.

"Supplemental Notice of Allowance", U.S. Appl. No. 13/224,839, Mar. 20, 2014, 4 pages.

"Will Smartphones of the Future Eliminate the Need for Tablets?", Retrieved from: <http://liliputing.com/2010/08/will-smartphones-of-the-future-eliminate-the-need-for-tablets.html> on Feb. 21, 2011, Aug. 10, 2010, 9 pages.

Luttrell, "Flexible Display Concepts are Cooler with Android", Retrieved from: <http://www.tgdaily.com/mobility-brief/53944-flexible-display-concepts-are-cooler-with-android> on Feb. 21, 2011, Feb. 4, 2011, 4 pages.

"European Search Report", EP Application No. 12827695.3, Jun. 11, 2014, 3 pages.

"Final Office Action", U.S. Appl. No. 13/154,876, Jun. 24, 2014, 10 pages.

"Foreign Office Action", CN Application No. 201210319598.1, Jun. 17, 2014, 12 pages.

"Foreign Office Action", EP Application No. 12827695.3, Jul. 14, 2014, 6 Pages.

"Foreign Office Action", CN Application No. 201210319598.1, Nov. 15, 2014, 7 pages.

"Non-Final Office Action", U.S. Appl. No. 13/154,876, Dec. 11, 2014, 9 pages.

"Final Office Action", U.S. Appl. No. 13/154,876, Jun. 1, 2015, 10 pages.

"Foreign Office Action", CN Application No. 201210319598.1, Jun. 4, 2015, 7 Pages.

"Foreign Office Action", EP Application No. 12827695.3, Mar. 10, 2015, 6 Pages.

EXPANDABLE MOBILE DEVICE

RELATED APPLICATIONS

This application is a continuation of U.S. application Ser. No. 13/224,839, entitled "EXPANDABLE MOBILE DEVICE" which was filed Sep. 2, 2011. The teachings of which are incorporated herein by reference.

BACKGROUND

Portable electronic devices, such as mobile phones, media players, and tablet computers are increasingly common. These types of devices typically include an integrated display device, and many include dual displays. For example, a mobile device can be hinged to open two display devices side-by-side to form one larger display. Users typically want the smallest possible devices to conveniently carry in a pocket or purse, but also want devices with larger display surfaces for easier viewing. Display manufacturers are developing flexible displays that may be used to provide a larger display surface than would be typically integrated in a smaller, portable electronic device. However, flexible displays are susceptible to damage when coiled or spooled-up in an extendable device, or when folded in a hinged device.

SUMMARY

This Summary introduces simplified concepts of an expandable mobile device, and the concepts are further described below in the Detailed Description and/or shown in the Figures. This Summary should not be considered to describe essential features of the claimed subject matter, nor used to determine or limit the scope of the claimed subject matter.

An expandable mobile device is described. In embodiments, the expandable mobile device includes housing parts that slide-engage relative to each other to extend and retract the device. The expandable mobile device includes a flexible display that extends from an interior of the device as one housing part slides out from another housing part. The flexible display also retracts into the interior of the expandable mobile device as the housing parts slide together.

Rollers are integrated in the device and bend the flexible display around a fixed radius to position a first, viewable section of the flexible display approximately parallel to a second, retracted section of the flexible display in a retracted position of the expandable mobile device. The rollers also bend the flexible display through a one-hundred and eighty degree (180°) bend that positions the first section of the flexible display approximately parallel to the second section of the flexible display. The second section of the flexible display rolls through the fixed radius over the rollers and extends from the housing part in an extended position of the expandable mobile device.

In other embodiments, the expandable mobile device includes support plates that support the flexible display in both the retracted and extended positions of the device. Additionally, carrier tracks gear-engage the rollers and position the first support plate adjacent the second support plate in the extended position of the expandable mobile device. The first support plate can also be positioned over the second support plate in the retracted position of the expandable mobile device when the first support plate engages the second support plate. The second support plate can also actuate to position the second support plate under the second section of the flexible display in the extended position of the device when the first support plate is positioned adjacent the second support plate. The device can also include a bistable mechanism to bias the housing parts when the expandable mobile device is extended and retracted.

BRIEF DESCRIPTION OF THE DRAWINGS

Embodiments of an expandable mobile device are described with reference to the following Figures. The same numbers may be used throughout to reference like features and components that are shown in the Figures.

DETAILED DESCRIPTION

An expandable mobile device is described, such as a mobile phone or tablet computer, that includes a flexible display and can be expanded to approximately double the display area for viewing, or retracted to maintain a typical hand-held device form factor. Notably, the flexible display does not spool or roll-up when the device is in a retracted position. Rather, the flexible display bends through a fixed radius over rollers that provide a minimum bend radius allowable for the TFT (thin film transistor) array of an AMOLED flexible display. In the retracted position of the expandable mobile device, a section of the flexible display bends through a one-hundred and eighty degree (180°) bend over the rollers, which positions a viewable section of the flexible display approximately parallel to a retracted section of the flexible display that is retracted into the interior of the device.

Additionally, the expandable mobile device includes support plates that provide a rigid support when the flexible display is extended as the device is expanded, and particularly to provide a rigid support surface for touch-screen interaction. A first support plate can be affixed to the primary section of the flexible display and is configured to be positioned adjacent a second support plate in the extended position of the expandable mobile device to support the flexible display. The first support plate is also configured to be positioned over the second support plate in the retracted position of the device. The first and second support plates slide-engage, as the first support plate rides over the second support plate, pushing the second support plate down where it is held in place under the first support plate.

In implementations, a flexible display may be a display stack of various layers, such as with a touch sensor layer laminated over the AMOLED layer, along with a laminated cover film or a hard coating over the touch sensor layer. In the extended position of the expandable mobile device, the second support plate provides a rigid support surface for the extended flexible display stack. An actuation mechanism, such as a spring or other tension mechanism, is implemented to position and maintain the second support plate, pushing the second support plate up from the interior of the expandable mobile device to support the flexible display stack. The actuation mechanism is released when the device is retracted and the first and second support plates slide-engage as the first support plate rides over the second support plate, pushing the second support plate down where it is held in place under the first support plate.

While features and concepts of an expandable mobile device can be implemented in any number of different devices, systems, and/or configurations, embodiments of an expandable mobile device are described in the context of the following example devices, systems, and methods.

Figure 1:
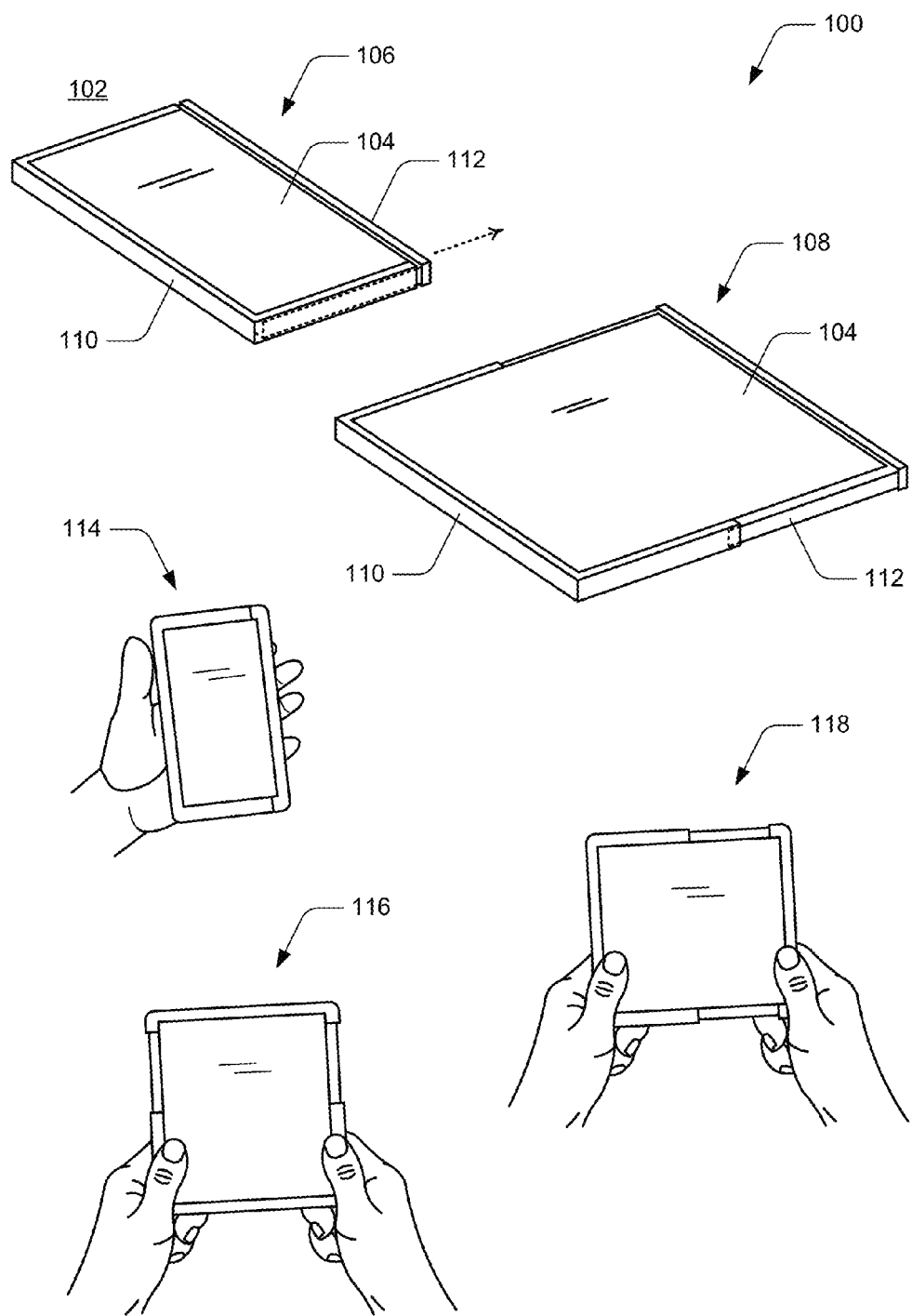
FIG. 1 illustrates examples of an expandable mobile device in accordance with one or more embodiments.

FIG. 1 illustrates examples 100 of an expandable mobile device 102 in accordance with embodiments described herein. The expandable mobile device includes a flexible display 104, such as a flexible OLED display or flexible AMOLED (Active Matrix Organic Light Emitting Diode) display that self-emits without the need for an integrated backlight. Alternatively, the flexible display may be implemented as a flexible LCD display that is illuminated with a flexible backlight.

The expandable mobile device 102 is shown in a closed, or retracted position 106, and is also shown in an open, or extended position 108 that approximately doubles the display area of the flexible display 104. The expandable mobile device includes a first housing part 110 and a second housing part 112 that are operable to slide-engage relative to each other to extend and retract the device. In this example, the second housing part is implemented to slide out from and into the first housing part. In alternate implementations, an expandable mobile device may be configured with additional housing sections, such as a three-section telescoping device with multiple stages that extend to expand the device and the flexible display.

The expandable mobile device 102 may be implemented in any form of a consumer, computer, media playback, communication, navigation, gaming, and/or electronic device that is configured to expand with a flexible display. For example, the expandable mobile device may be implemented as a mobile phone device with a section of the flexible display always visible when the device is in the closed, retracted position as shown at 114. A user can then slide open the device to the extended position, which approximately doubles the display area of the flexible display as shown at 116 and in a rotated position at 118. The expandable mobile device 102 can be implemented with any combination of various components as further described with reference to the example electronic device shown in FIG. 5. Additionally, the expandable mobile device can include any combination of software, firmware, hardware, and processing components for orientation detection and operability.

Figure 2:
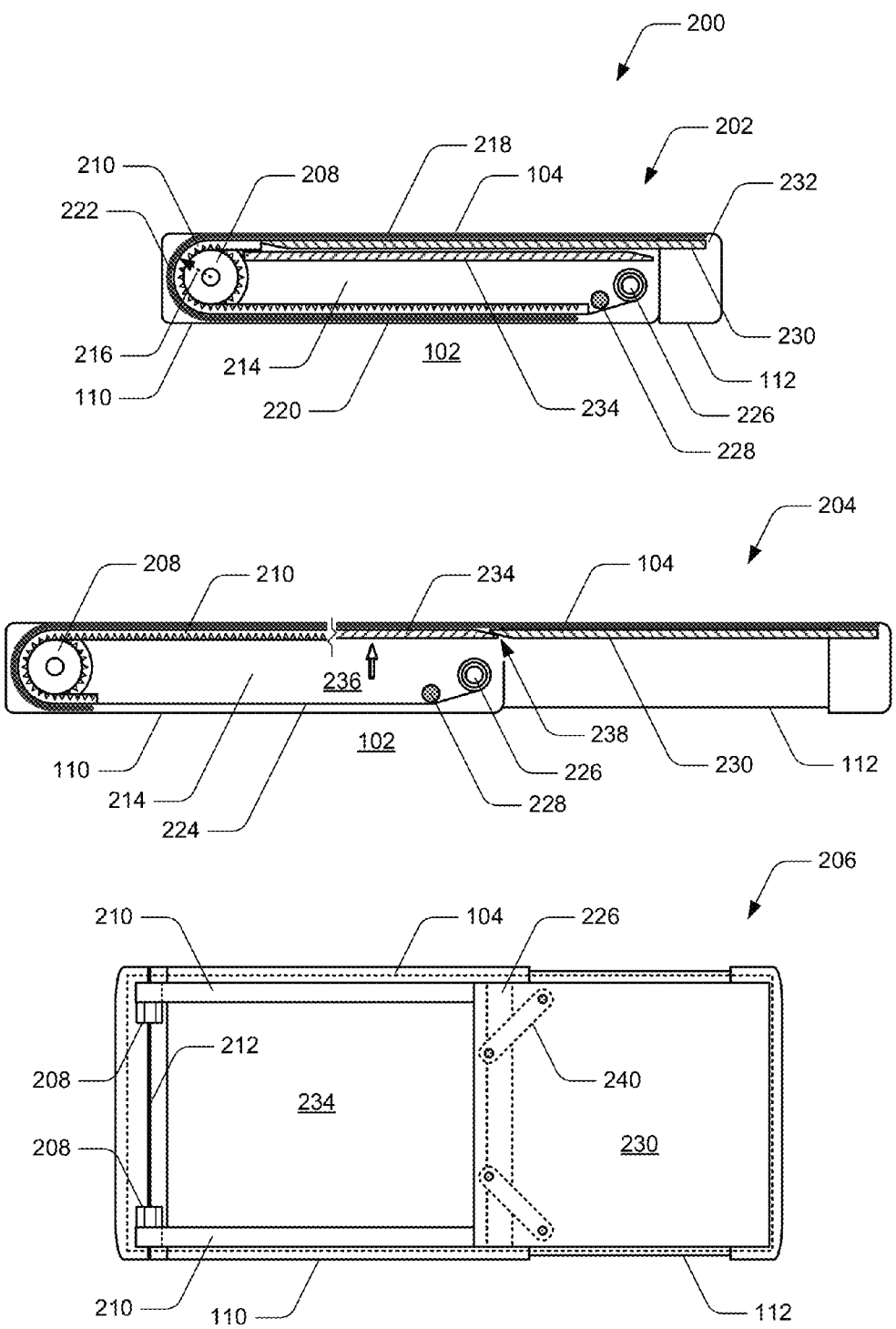
FIG. 2 further illustrates the examples of the expandable mobile device described with reference to FIG. 1 in accordance with one or more embodiments.

FIG. 2 further illustrates examples 200 of the expandable mobile device 102 with the integrated flexible display 104 described with reference to FIG. 1. The device is shown in the closed, retracted position at 202 and in the open, extended position at 204. The device is also shown in a top view at 206. The expandable mobile device includes rollers 208 that are integrated in the first housing part 110, as well as carrier tracks 210 that are implemented to gear-engage the rollers. In this example, the carrier tracks are implemented as caterpillar-type tracks that roll around and are geared to the fixed-radius rollers 208 that are coupled by a connecting axle 212. In an implementation, the flexible display 104 is affixed to the carrier tracks 210 along the two side edges of the flexible display.

The flexible display 104 is implemented to extend from the interior 214 of the expandable mobile device 102 as the second housing part 112 slides out from the first housing part 110. The flexible display is also implemented to retract into the interior of the expandable mobile device as the second housing part slides into the first housing part. The carrier tracks 210 roll around the fixed-radius rollers 208 that are integrated in the first housing part of the device, and as the carrier tracks bend, the flexible display bends around a fixed radius 216 to position a first, viewable section 218 of the flexible display approximately parallel to a second, retracted section 220 of the flexible display in the retracted position 202 of the expandable mobile device. The rollers bend the flexible display at 222 through a one-hundred and eighty degree (180°) bend that positions the viewable section of the flexible display approximately parallel to the retracted section of the flexible display in the retracted position of the device.

The second section 220 of the flexible display 104 bends through the fixed radius 216 over the rollers 208 and extends from the first housing part 110 in the extended position 204 of the expandable mobile device. The rollers provide the minimum bend radius allowable for the bend-sensitive parameters of the flexible display stack (e.g., TFT (thin film transistor) array) of the AMOLED flexible display. As noted above, the flexible display 104 can be implemented as a display stack of various layers, such as with a touch sensor layer laminated over the AMOLED layer, along with a laminated cover film or a hard coating over the touch sensor layer.

The carrier tracks 210 and the flexible display stack do not spool-up on the fixed-radius rollers 208. Rather, the carrier tracks are attached to a take-up film 224 (e.g., a sheet of thin material) that extends to a take-up roller 226, which is spring-loaded and integrated in the first housing part on the opposite side of the fixed-radius rollers. The take-up film 224 is attached to both the trailing edge of the flexible display 104 and also to the ends of the carrier tracks 210. When the expandable mobile device is closed, the take-up film 224 is spooled onto the take-up roller 226 as the device is transitioned to the retracted position. The take-up roller 224 is pre-tensioned, such as by the action of a spring-loaded tensioner, and a positioning roller 228 is implemented to ensure that the take-up film 224 maintains an aligned orientation as the spool diameter increases when the device is transitioned to the retracted position.

A benefit of having the take-up film 224 attached to the trailing edge of the flexible display stack is that it minimizes the amount of display material (e.g., OLED, AMOLED) needed beyond that which is displayed in the open, extended position 204 of the expandable mobile device. Additionally, the optional take-up film 224 allows the flexible display to be retracted by the action of the spring-loaded tensioner and positioning roller, along with the bistable action of a slider mechanism, thus avoiding any propensity for crinkling or buckling of the flexible display as the expandable mobile device is closed to the retracted position. In alternate implementations, the flexible display may be tensioned with other mechanisms rather than the optional take-up film and tensioner spool, such as with springs acting on levers that are connected to the carrier tracks. Alternatively, the flexible display may not be tensioned, depending on the rigidity and/or stiffness of the flexible display stack. In this implementation, the flexible display remains rigid between the carrier tracks and the flexible display is pushed into the retracted position by action of the bistable slide mechanism springs.

In embodiments, the expandable mobile device 102 includes support plates that support the flexible display. A first support plate 230 supports the first section 218 of the flexible display 104 in both the retracted position 202 and in the extended position 204 of the device. The flexible display 104 and the first support plate are attached at 232 to the first housing part 110, and the flexible display is attached to the top of the carrier tracks 210. A second support plate 234 supports the second section 220 of the flexible display in the extended position of the device when the second section of the flexible display is extended out from the interior 214 of the device. The second support plate is configured for actuation to raise and rigidly position the second support plate under the second section of the flexible display in the extended position of the expandable mobile device.

In an implementation, an actuation mechanism 236, such as a spring or other tension mechanism, is implemented to position and maintain the second support plate 234, pushing the second support plate up from the interior 214 of the expandable mobile device 102 to support the flexible display 104. The actuation mechanism can be released by application of a closure force on a locking mechanism release when the device is retracted and the first and second support plates slide-engage at 238 as the first support plate 230 rides over the second support plate 234, pushing the second support plate down where it is held in place under the first support plate. The first support plate engages the second support plate to position the first support plate over the second support plate in the retracted position 202 of the expandable mobile device. The carrier tracks 210 are implemented to gear-engage the rollers 208 and position the first support plate 230 adjacent the second support plate 234 in the extended position 204 of the expandable mobile device 102.

The expandable mobile device 102 can also include a bi-stable mechanism 240, such as spring assemblies, that are implemented to bias the first and second housing parts when the expandable mobile device is extended and retracted as a user initiates opening and closing the device. In implementations, the first and second housing parts of the device may be transparent, and the second section 220 of the flexible display 104 is viewable from the bottom through the first and second housing parts of the expandable mobile device in the retracted position 202 of the device.

Figure 3:
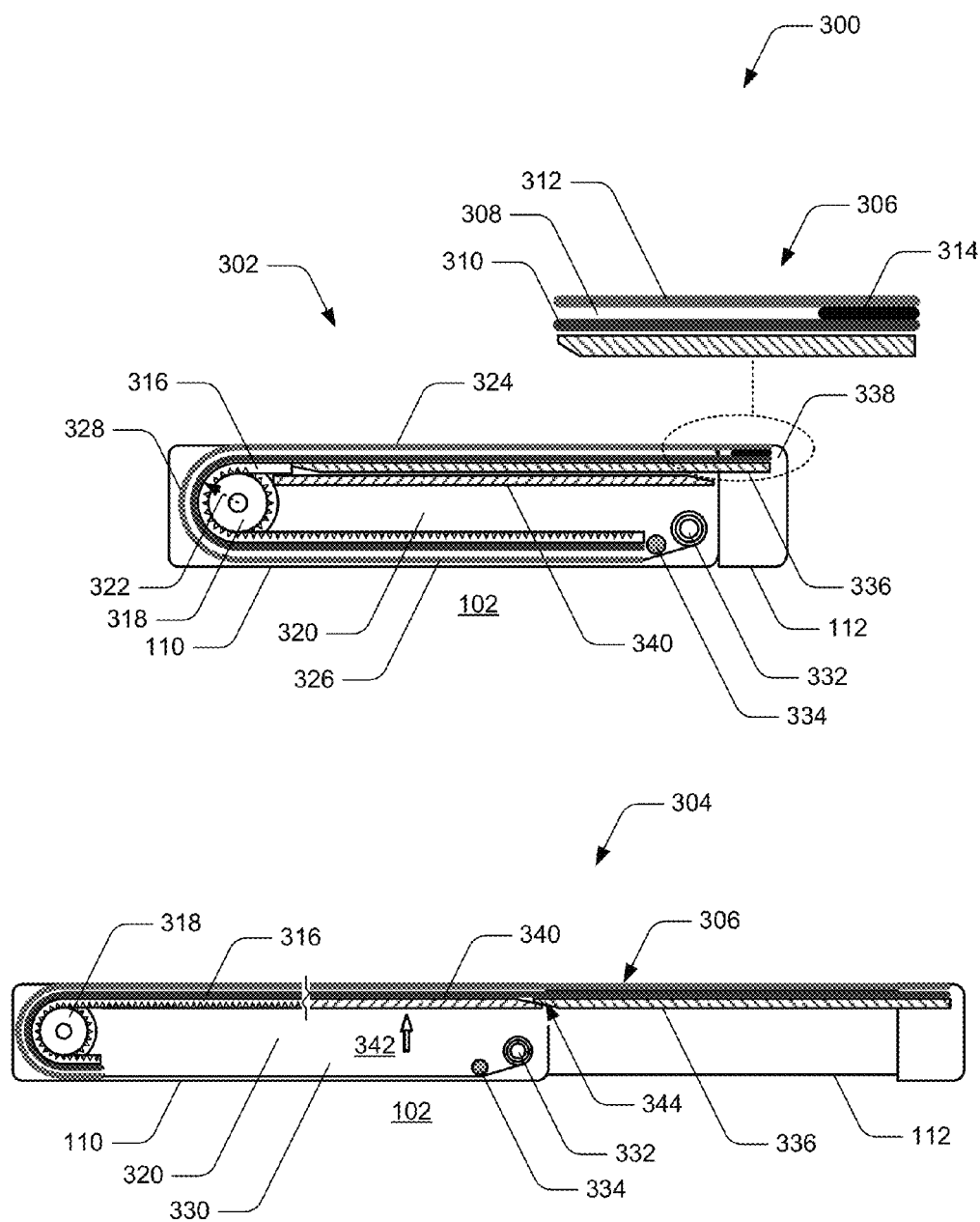
FIG. 3 illustrates another example of the expandable mobile device described with reference to FIG. 1 in accordance with one or more embodiments.

FIG. 3 further illustrates another example 300 of the expandable mobile device 102 described with reference to FIG. 1. The device is shown in the closed, retracted position at 302 and in the open, extended position at 304. In this example, the expandable mobile device includes a flexible display stack 306 that is implemented with an air gap 308 between a flexible display 310 and a touch sensor 312 (e.g., or other type of cover film). In this embodiment, the touch sensor is not laminated to the flexible display, but rather the touch sensor is bonded 314 to the flexible display just at the fixed end of the device.

The flexible display 310 is affixed to carrier tracks 316 along the two side edges of the flexible display. In this display stack configuration with the air gap between the flexible display 310 and the touch sensor 312, the touch sensor can move relative to the flexible display throughout the range of the device being extended and retracted, and the flexible display stack bending to retract into the interior of the expandable mobile device. Additionally, the touch sensor being bonded to the flexible display at the fixed end of the device maintains the touch sensor in a taut position over the flexible display throughout the range of the device being extended and retracted since the opposite end of the touch sensor is attached to the take-up film and tensioner spool.

As described with reference to the expandable mobile device 102 shown in FIG. 3, the device includes rollers 318 that are integrated in the first housing part 110, and the carrier tracks 316 are implemented to gear-engage the rollers. In this example, the carrier tracks are implemented as caterpillar-type tracks that roll around and are geared to the fixed-radius rollers 318 that are coupled by a connecting axle.

The flexible display stack 306 is implemented to extend from the interior 320 of the expandable mobile device 102 as the second housing part 112 slides out from the first housing part 110. The flexible display stack is also implemented to retract into the interior of the expandable mobile device as the second housing part slides into the first housing part. The carrier tracks 316 roll around the fixed-radius rollers 318 that are integrated in the first housing part of the device, and as the carrier tracks bend, the flexible display stack bends around a fixed radius 322 to position a first, viewable section 324 of the flexible display stack approximately parallel to a second, retracted section 326 of the flexible display stack in the retracted position 302 of the expandable mobile device.

The rollers bend the flexible display stack at 328 through a one-hundred and eighty degree (180°) bend that positions the viewable section of the flexible display stack approximately parallel to the retracted section of the flexible display stack in the retracted position of the device. The second section 326 of the flexible display stack 306 bends through the fixed radius 322 over the rollers 318 and extends from the first housing part 110 in the extended position 304 of the expandable mobile device. The rollers provide the minimum bend radius allowable for the bend-sensitive parameters of the flexible display stack.

The end of the touch sensor 312 is attached to a take-up film 330 (e.g., a sheet of thin material) that extends to a take-up roller 332, which is spring-loaded and integrated in the first housing part on the opposite side of the fixed-radius rollers. When the expandable mobile device is closed, the take-up film 330 is spooled onto the take-up roller as the device is transitioned to the retracted position. The take-up roller can also be pre-tensioned, such as by the action of a spring-loaded tensioner, and a positioning roller 334 is implemented to ensure that the take-up film maintains an aligned orientation as the spool diameter increases when the device is transitioned to the retracted position. The take-up roller is utilized to tension the touch sensor 312 that is not laminated to the flexible display 310 of the flexible display stack 306 in this example implementation. Alternatively, a display stack configuration may include a protective cover film that is attached to the take-up film as similarly described herein with reference to the touch sensor. In this configuration, the touch sensor is laminated to the flexible display, or to part of the flexible display.

In embodiments, the expandable mobile device 102 includes support plates that support the flexible display stack. A first support plate 336 supports the first section 324 of the flexible display stack in both the retracted position 202 and in the extended position 204 of the device. The flexible display stack and the first support plate are attached at 338 to the first housing part 110, and the flexible display stack is attached to the top of the carrier tracks 316. A second support plate 340 supports the second section 326 of the flexible display stack in the extended position of the device when the second section of the flexible display stack is extended out from the interior 320 of the device. The second support plate is configured for actuation to raise and rigidly position the second support plate under the second section of the flexible display stack in the extended position of the expandable mobile device.

In an implementation, an actuation mechanism 342, such as a spring or other tension mechanism, is implemented to position and maintain the second support plate 340, pushing the second support plate up from the interior of the expandable mobile device 102 to support the flexible display stack. The actuation mechanism can be released by application of a closure force on a locking mechanism release when the device is retracted and the first and second support plates slide-engage at 344 as the first support plate 336 rides over the second support plate 340, pushing the second support plate down where it is held in place under the first support plate. The first support plate engages the second support plate to position the first support plate over the second support plate in the retracted position 302 of the expandable mobile device.

Figure 4:
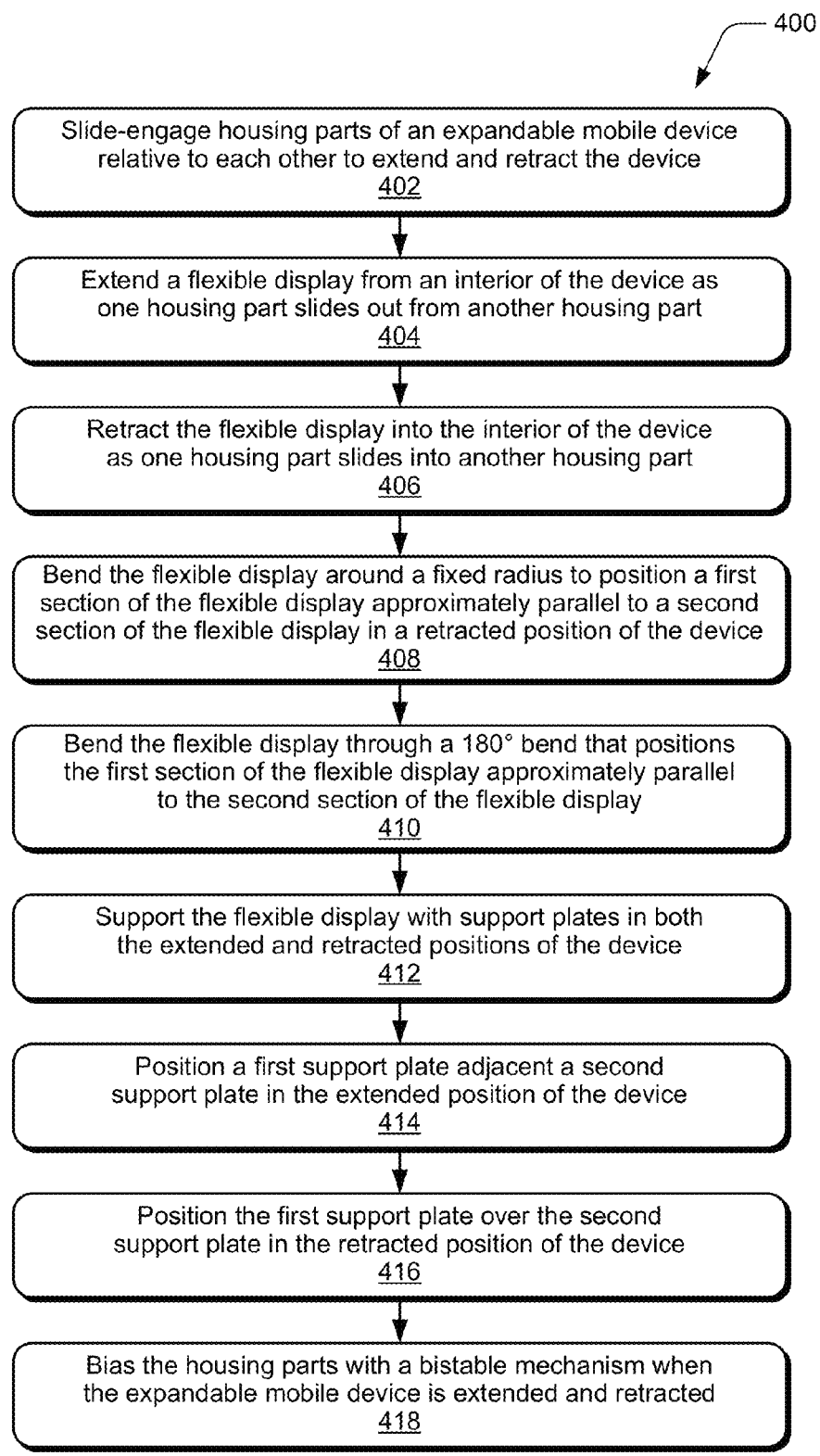
FIG. 4 illustrates example method(s) of an expandable mobile device in accordance with one or more embodiments.

FIG. 4 illustrates example method(s) 400 of an expandable mobile device. The order in which the method blocks are described are not intended to be construed as a limitation, and any number of the described method blocks can be combined in any order to implement a method, or an alternate method.

At block 402, housing parts of an expandable mobile device are slide-engaged relative to each other to extend and retract the device. For example, the expandable mobile device 102 (FIG. 1) includes the first housing part 110 and the second housing part 112 that slide-engage relative to each other to extend and retract the device. At block 404, a flexible display is extended from an interior of the device as one housing part slides out from another housing part. For example, the expandable mobile device 102 includes the flexible display 104 that extends from the interior 214 (FIG. 2) of the device as the second housing part 112 slides out from the first housing part 110. The flexible display bends through the fixed radius 216 over the rollers 208 and extends from the first housing part 110 in the extended position 204 of the expandable mobile device.

At block 406, the flexible display is retracted into the interior of the device as one housing part slides into another housing part. For example, the flexible display 104 retracts into the interior of the expandable mobile device 102 as the second housing part 112 slides into the first housing part 110. At block 408, the flexible display bends around a fixed radius to position a first section of the flexible display approximately parallel to a second section of the flexible display in a retracted position of the device. For example, the flexible display 104 bends around the fixed radius 216 to position the first, viewable section 218 of the flexible display approximately parallel to the second, retracted section 220 of the flexible display in the retracted position 202 of the expandable mobile device.

At block 410, the flexible display bends through a one-hundred and eighty degree (180°) bend that positions the first section of the flexible display approximately parallel to the second section of the flexible display. For example, the rollers 208 bend the flexible display 104 through a one-hundred and eighty degree (180°) bend at 222 to position the first, viewable section 218 of the flexible display approximately parallel to the second, retracted section 220 of the flexible display.

At block 412, the flexible display is supported with support plates in both the extended and retracted positions of the device. For example, the expandable mobile device 102 includes a first support plate 230 that supports the first section 218 of the flexible display 104 in both the retracted position 202 and in the extended position 204 of the device. The expandable mobile device also includes a second support plate 234 that supports the second section 220 of the flexible display in the extended position of the device when the second section of the flexible display is extended out from the interior 214 of the device. The second support plate is configured for actuation to position the second support plate under the second section of the flexible display in the extended position of the expandable mobile device.

At block 414, the first support plate is positioned adjacent the second support plate in the extended position of the device. For example, the first support plate 230 is positioned adjacent the second support plate 234 in the extended position 204 of the expandable mobile device 102. At block 416, the first support plate is positioned over the second support plate in the retracted position of the device. For example, the first and second support plates slide-engage at 238, and the first support plate 230 rides over the second support plate 234, pushing the upwardly spring loaded second support plate down where it is held in place under the first support plate.

At block 418, the housing parts are biased with a bistable mechanism when the expandable mobile device is extended and retracted. For example, the expandable mobile device 102 includes a bi-stable mechanism 240, such as spring assemblies, that are implemented to bias the first and second housing parts when the expandable mobile device is extended and retracted as a user initiates opening and closing the device.

Figure 5:
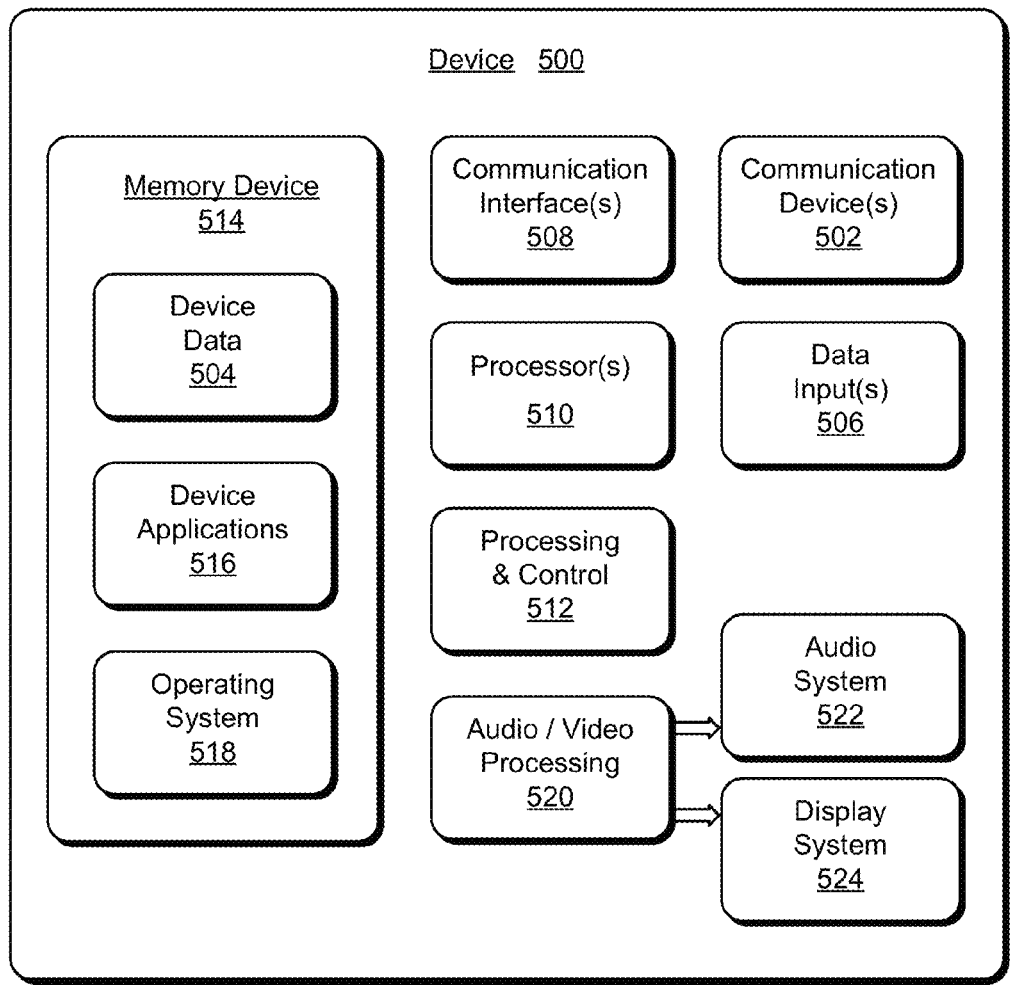
FIG. 5 illustrates various components of an example electronic device in which embodiments of an expandable mobile device can be implemented.

FIG. 5 illustrates various components of an example device 500 that can be implemented as any of the expandable mobile devices described with reference to the previous FIGS. 1-4. In embodiments, the device may be implemented in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 506 via which any type of data, media content, and/or inputs can be received, such as user-selectable inputs and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 514 provides data storage mechanisms to store the device data 504, other types of information and/or data, and various device applications 516. For example, an operating system 518 can be maintained as a software application with the memory device and executed on the processors. The device applications may also include a device manager, such as any form of a control application, software application, signal processing and control module, code that is native to a particular device, a hardware abstraction layer for a particular device, and so on.

The device 500 also includes an audio and/or video processing system 520 that generates audio data for an audio system 522 and/or generates display data for a display system 524, such as an integrated flexible display. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are integrated components of the example device. Alternatively, the audio system and/or the display system are external components to the device.

Although embodiments of an expandable mobile device have been described in language specific to features and/or methods, the subject of the appended claims is not necessarily limited to the specific features or methods described. Rather, the specific features and methods are disclosed as example implementations of an expandable mobile device.

The invention claimed is:

1. An expandable mobile device, comprising:
   first and second housing parts configured to slide-engage relative to each other to extend and retract the expandable mobile device;
   a flexible display configured to extend from an interior of the expandable mobile device as the second housing part slides out from the first housing part, the flexible display further configured to retract into the interior of the expandable mobile device as the second housing part slides into the first housing part;
   rollers integrated in the first housing part and configured to bend the flexible display around a fixed radius to position a first section of the flexible display proximate a second section of the flexible display in a retracted position of the expandable mobile device; and
   carrier tracks configured to gear-engage the rollers and position the second section of the flexible display adjacent the first section of the flexible display in an extended position of the expandable mobile device.

2. An expandable mobile device as recited in claim 1, wherein the second section of the flexible display is configured to roll through the fixed radius over the rollers and extend from the first housing part in an extended position of the expandable mobile device.

3. An expandable mobile device as recited in claim 1, wherein the rollers bend the flexible display through a one-hundred and eighty degree (180°) bend that positions the first section of the flexible display proximate the second section of the flexible display.

4. An expandable mobile device as recited in claim 1, further comprising a bistable mechanism configured to bias the first and second housing parts when the expandable mobile device is extended and retracted.

5. An expandable mobile device as recited in claim 1, wherein the first and second housing parts are transparent, and the second section of the flexible display is viewable in the interior of the expandable mobile device in the retracted position of the expandable mobile device.

6. An expandable mobile device as recited in claim 1, further comprising at least one support surface configured to support at least a portion of the flexible display.

7. An expandable mobile device as recited in claim 6, wherein the at least one support surface is configured to support the first section of the flexible display.

8. An expandable mobile device as recited in claim 6, wherein the at least one support surface is configured to support the second section of the) flexible display.

9. A method, comprising:
   slide-engaging first and second housing parts of an expandable mobile device relative to each other to extend and retract the expandable mobile device;
   retracting a flexible display into an interior of the expandable mobile device when the second housing part slides into the first housing part;
   bending the flexible display around a fixed radius to position a first section of the flexible display proximate a second section of the flexible display in a retracted position of the expandable mobile device; and
   supporting at least a portion of the flexible display with at least one support surface.

10. A method as recited in claim 9, further comprising extending the second section of the flexible display from the interior of the expandable mobile device when the second housing part slides out from the first housing part.

11. A method as recited in claim 10, further comprising rolling the second section of the flexible display through the fixed radius to said extend the second section of the flexible display from the interior of the expandable mobile device.

12. A method as recited in claim 9, further comprising bending the flexible display through a one-hundred and eighty degree (180°) bend that positions the first section of the flexible display proximate the second section of the flexible display.

13. A method as recited in claim 9, further comprising biasing the first and second housing parts with a bistable mechanism when the expandable mobile device is extended and retracted.

14. A method as recited in claim 9, wherein the at least one support surface is configured to support the first section of the flexible display.

15. A method as recited in claim 9, wherein the at least one support surface is configured to support the second section of the flexible display.

16. A display device, comprising:
   first and second housing parts configured to slide-engage relative to each other to extend and retract a flexible display, the flexible display configured to extend from an interior of the display device as the second housing part slides out from the first housing part, the flexible display configured to retract into the interior of the display device as the second housing part slides into the first housing part;
   rollers located in the first housing part and configured to bend the flexible display around a fixed radius to position a first section of the flexible display proximate a second section of the flexible display in a retracted position of the display device; and
   at least one support surface configured to support at least a portion of the flexible display.

17. The display device of claim 16, wherein the first section of the flexible display and the second section of the flexible display comprise a continuous display material.

18. The display device of claim 16, further comprising an additional support surface, wherein the at least one support surface is configured to support the first section of the flexible display, and wherein the additional support surface is configured to support the second section of the flexible display.

19. The display device of claim 16, wherein the at least one support surface is configured to support the first section of the flexible display.

20. The display device of claim 16, wherein the at least one support surface is configured to support the second section of the flexible display.

* * * * *